United States Patent
Bloom et al.

(10) Patent No.: US 9,965,771 B2
(45) Date of Patent: May 8, 2018

(54) SYSTEM AND METHOD OF TRACKING VIDEO ADVERTISEMENTS

(75) Inventors: Jeffrey A. Bloom, West Windsor, NJ (US); Joseph P. Mele, Sea Girt, NJ (US)

(73) Assignee: DIALOGIC CORPORATION, Montreal, Quebec (CA)

( * ) Notice: Subject to any disclaimer, the term of this patent is extended or adjusted under 35 U.S.C. 154(b) by 822 days.

(21) Appl. No.: 12/829,637

(22) Filed: Jul. 2, 2010

(65) Prior Publication Data

US 2012/0004958 A1   Jan. 5, 2012

(51) Int. Cl.
*G06Q 30/00* (2012.01)
*G06Q 30/02* (2012.01)

(52) U.S. Cl.
CPC .............. *G06Q 30/0241* (2013.01)

(58) Field of Classification Search
USPC ........................................... 705/14
See application file for complete search history.

(56) References Cited

U.S. PATENT DOCUMENTS

| | | | |
|---|---|---|---|
| 2007/0092108 A1 | 4/2007 | Alattar et al. | |
| 2007/0242771 A1 | 10/2007 | Kondo | |
| 2008/0256315 A1 | 10/2008 | Awai | |
| 2009/0154368 A1* | 6/2009 | Kim | H04L 41/509 370/252 |
| 2010/0020868 A1 | 1/2010 | Ayres, Jr. et al. | |
| 2010/0042747 A1 | 2/2010 | Hascalovici et al. | |
| 2010/0111008 A1 | 5/2010 | Ishii | |
| 2010/0274664 A1* | 10/2010 | Fernandez Gutierrez | G06Q 30/02 705/14.45 |
| 2010/0312816 A1* | 12/2010 | Deprun | 709/201 |
| 2011/0188704 A1* | 8/2011 | Radhakrishnan et al. | 382/100 |
| 2011/0307509 A1* | 12/2011 | Hsiao et al. | 707/769 |
| 2012/0201476 A1* | 8/2012 | Carmel | H04N 19/176 382/239 |
| 2013/0162841 A1* | 6/2013 | Gustafsson et al. | 348/192 |

FOREIGN PATENT DOCUMENTS

| | | |
|---|---|---|
| WO | WO 02/085033 | 10/2002 |
| WO | WO 2010/022303 | 2/2010 |

OTHER PUBLICATIONS

U.S. Appl. No. 12/623,478, Jeffrey A. Bloom.
U.S. Appl. No. 12/706,165, Chunhua Chen.
U.S. Appl. No. 12/757,389, Chunhua Chen.

(Continued)

*Primary Examiner* — Alvin L Brown
(74) *Attorney, Agent, or Firm* — BainwoodHuang

(57) ABSTRACT

Systems and methods of tracking multimedia content transmitted over at least one network to one or more mobile devices that may be employed to verify delivery of the multimedia content to the respective mobile devices, and to determine the perceptual quality (also referred to herein as "quality of experience" or "QoE") of the multimedia content at the respective mobile devices. The systems and methods employ content identification techniques in conjunction with objective quality measures to allow mapping of the quality of experience or QoE to specific multimedia content, which may include audio content, imagery content, textual content, and/or video content.

27 Claims, 5 Drawing Sheets

(56) References Cited

OTHER PUBLICATIONS

Stephen Wolf and Margaret H. Pinson, "Low Bandwidth Reduced Reference Video Quality Monitoring System", proceedings of the Workshop on Video Processing and Quality Metrics for Consumer Electronics (VPQM), Jan. 2005, Electronic Proceedings.
Ingeman Cox, Matthew Miller, and Jeffrey Bloom, Digital Watermarking, Morgan Kaufmann, 2001.
R. Mohan, "Video sequence matching," Proceedings of International Conference on Acoustics, Speech and Signal Processing, vol. 6, pp. 3697-3700, 1998.
R. Muijs and I. Kirenko, "A no-reference blocking artifact measure for adaptive video processing," European Signal Processing Conference (EUSIPCO'2005), Antalya, Turkey, Sep. 2005, Electronic Proceedings.
I. O. Kirenko R. Muijs, and L. Shao, "Coding artifact reduction using non-reference block grid visibility measure," International Conference on Multimedia and Expo 2006 (ICME'06), Toronto, ON, Canada, Jul. 2006, pp. 469-472.
P. Indyk, and R. Motwani, "Approximate nearest neighbors: towards removing the curse of dimensionalities," Proceedings of the 30th Symposium on Theory of Computing, pp. 604-613, 1998.
A. Gionis, P. Indyk, and R. Motwani, "Similarity search in high dimensions via hashing," Proceedings of the 25th International Conference on Very Large Data Bases (VLDB), pp. 518-529, 1999.

\* cited by examiner

US 9,965,771 B2

SYSTEM AND METHOD OF TRACKING VIDEO ADVERTISEMENTS

STATEMENT REGARDING FEDERALLY SPONSORED RESEARCH OR DEVELOPMENT

Not applicable

STATEMENT REGARDING FEDERALLY SPONSORED RESEARCH OR DEVELOPMENT

Not applicable

FIELD OF THE INVENTION

The present application relates generally to systems and methods of delivering multimedia content over at least one network to one or more users, and more specifically to such systems and methods of delivering multimedia content that can be used to verify delivery of the multimedia content to the respective users, and to determine the perceptual quality of the multimedia content delivered to the respective users.

BACKGROUND OF THE INVENTION

The ever-increasing usage of mobile phones throughout the world has contributed to the emergence of mobile advertising, which is a form of advertising via mobile phones, mobile computers, or other types of mobile devices. According to recent estimates, about 75% of mobile phone users in Spain, about 62% of mobile phone users in France, and about 54% of mobile phone users in Japan report receiving advertisements via their mobile phones. In conventional mobile advertising campaigns, advertisers generate advertisement content (also referred to herein as the "ad content"), including audio content, imagery content, textual content, and/or video content, and provide the ad content to multimedia content providers for insertion into streams of multimedia content, which may constitute music, movies, videos, or other types of multimedia content. The multimedia content providers transmit the streams of multimedia content, including the ad content, over communications networks for receipt at one or more mobile phones or devices. For example, such ad content has traditionally included mobile web banners, mobile web posters, SMS advertising, MMS advertising, advertising within mobile games and/or videos, audio advertisements, etc. Further, the effectiveness of such mobile advertising campaigns has traditionally been measured by the number of views, the click-through rates, and/or the click-to-call rates generated by the ad content.

One drawback of the conventional mobile advertising campaigns described above is that advertisers typically have difficulty determining whether or not their ad content has been successfully delivered to the mobile devices. Another drawback is that the advertisers have virtually no way of determining the perceptual quality of the ad content delivered to the mobile devices. Such drawbacks have generally hindered the growth of the global mobile advertising market. Such difficulties/inabilities have also likely hindered, if not entirely prevented, other non-advertising related applications from reaching the mobile space, which not only has likewise hindered the growth of the mobile market overall, but also has prevented revenue generation for many of those associated with or interested in tapping into the mobile space.

BRIEF SUMMARY OF THE INVENTION

In accordance with the present application, systems and methods of tracking multimedia content transmitted over at least one network to one or more mobile devices are disclosed that may be employed to verify delivery of the multimedia content to the respective mobile devices, and to determine the perceptual quality (also referred to herein as the "quality of experience" or "QoE") of the multimedia content at the respective mobile devices. The presently disclosed systems and methods employ content identification techniques in conjunction with objective perceptual quality measures to allow mapping of the quality of experience to specific multimedia content, which may include audio content, imagery content, textual content, and/or video content.

In accordance with one aspect, a system for tracking multimedia content transmitted over at least one network to one or more mobile devices includes a multimedia content provider, a content quality aggregator, and at least one mobile device. The multimedia content provider and the mobile device are each operative to execute a software agent for implementing at least a portion of the functionality of the presently disclosed system. Specifically, the software agent executable by the multimedia content provider includes a content identification component, a perceptual quality measurement component, and a database insertion component. In accordance with one exemplary aspect, the content identification component is operative to extract a multimedia "fingerprint" from the multimedia content, and to provide the multimedia fingerprint to the database insertion component. The perceptual quality measurement component is operative to perform initial perceptual quality measurements (referred to herein as the "initial quality measures") on the multimedia content. In accordance with a further exemplary aspect, the perceptual quality measurement component employs no reference information in the perceptual quality measurement processes. The database insertion component is operative to provide the multimedia fingerprint, the initial quality measures, and any descriptive metadata for the multimedia content to the content quality aggregator for storage in a fingerprint database, a quality database, and a metadata database, respectively. The multimedia content provider is further operative to transmit the multimedia content over the network to the mobile device.

Like the software agent on the multimedia content provider, the software agent executable by the mobile device includes a content identification component operative to extract a multimedia fingerprint from the multimedia content received over the network from the multimedia content provider, and a perceptual quality measurement component operative to perform perceptual quality measurements (referred to herein as the "received quality measures") on the received multimedia content. Further, like the perceptual quality measurement component within the software agent on the multimedia content provider, the perceptual quality measurement component within the software agent on the mobile device employs no reference information in the perceptual quality measurement processes. The software agent on the mobile device further includes an encapsulation component operative to encapsulate the multimedia fingerprint and the received quality measures, and a transmitter operative to transmit the encapsulated multimedia fingerprint and received quality measures to the content quality aggregator.

The content quality aggregator includes a receiver, a fingerprint matching component, a metadata extraction component, and a quality calculation component. The receiver is operative to receive the encapsulated multimedia fingerprint and received quality measures from the mobile device, and to provide the multimedia fingerprint and the received quality measures to the fingerprint matching component and the quality calculation component, respectively. The fingerprint matching component is operative to locate a match for the multimedia fingerprint in the fingerprint database, thereby obtaining a unique fingerprint index for the respective multimedia fingerprint. In accordance with one exemplary aspect, both the metadata extraction component and the quality calculation component employ that same unique fingerprint index to retrieve descriptive metadata and initial perceptual quality measures from the metadata database and the quality database, respectively. Specifically, the metadata extraction component is operative to employ the unique fingerprint index to extract any descriptive metadata for the received multimedia content from the metadata database. Further, the quality calculation component is operative to employ the unique fingerprint index to retrieve the initial quality measures for the received multimedia content from the quality database. The quality calculation component is further operative to calculate an estimate of quality degradation for the received multimedia content based on a comparison of the received quality measures against the initial quality measures. The content quality aggregator is operative to provide at least one output containing the descriptive metadata and the calculated quality degradation for the received multimedia content in the form of one or more tracking reports, which may be used by the multimedia content provider to verify the delivery of the multimedia content to the mobile device, and to determine a level of perceptual quality of the multimedia content at the mobile device.

By extracting multimedia fingerprints from multimedia content, obtaining objective perceptual quality measures for the multimedia content before and after the transmission of the multimedia content over at least one network to one or more mobile devices, and employing the multimedia fingerprints in conjunction with the objective perceptual quality measures to allow mapping of the quality of experience to specific multimedia content, multimedia content providers can verify the delivery and determine the quality of experience of the multimedia content received at the respective mobile devices. Such functionality can be particularly useful to entities associated with mobile content and/or its delivery and usage such as advertisers, allowing them to efficiently track advertisement content transmitted to mobile devices of potential purchasers of advertised products and/or services.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of tracking multimedia content transmitted over at least one network to one or more mobile devices are disclosed that may be employed to verify delivery of the multimedia content to the respective mobile devices, and to determine the perceptual quality (also referred to herein as the "quality of experience" or "QoE") of the multimedia content at the respective mobile devices. In accordance with such disclosed systems and methods, content identification techniques are employed in conjunction with objective perceptual quality measures to allow mapping of the quality of experience to specific multimedia content.

Figure 1:
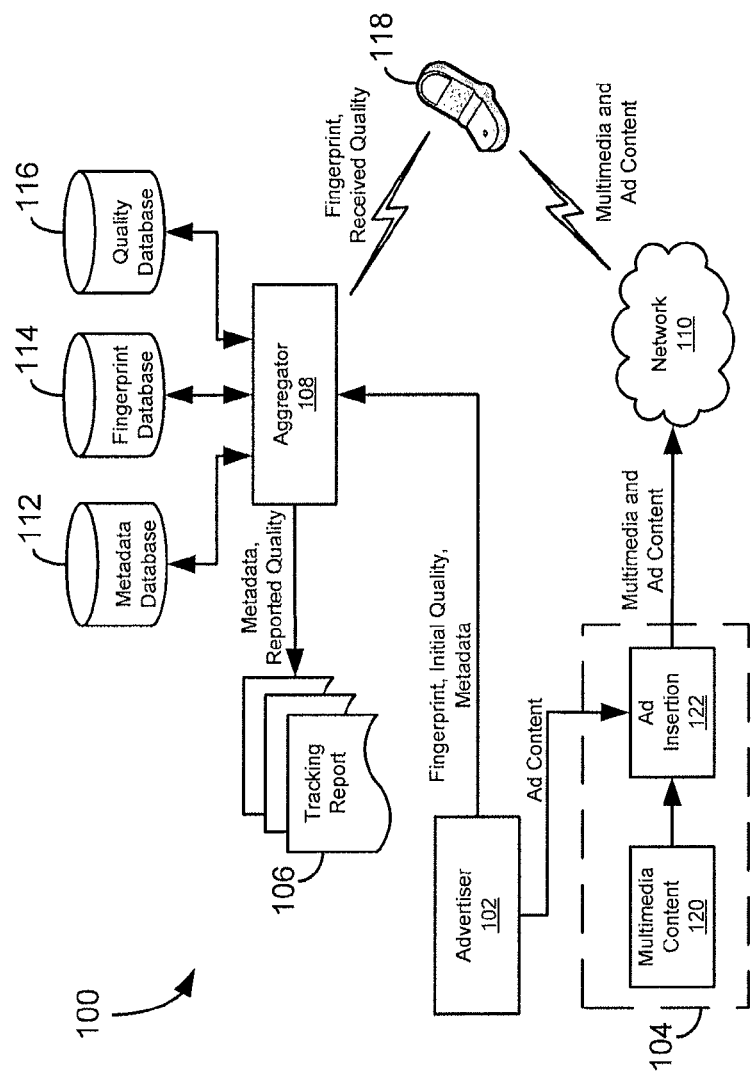
FIG. 1 is a block diagram of an exemplary system for tracking multimedia content transmitted over a network to a mobile device, according to an exemplary embodiment of the present application.

FIG. 1 depicts an illustrative embodiment of an exemplary system 100 for tracking multimedia content 120 transmitted over a network 110 to a mobile device 118, in accordance with the present application. As shown in FIG. 1, the system 100 includes an advertisement content provider 102 (also referred to herein as the "advertiser 102") and a content quality aggregator 108 in addition to the mobile device 118. The system 100 may be employed to track advertisement content 204 (see FIG. 2; also referred to herein as the "ad content 204") provided by the advertiser 102, and transmitted over the network 110 to the mobile device 118. It is noted that the terms "ad content" and "advertising content," as used herein, can refer to traditional advertising, in which a product, service and/or feature is introduced, promoted, or otherwise attempted to be featured or sold to a recipient of the content; however, it can also include promotional and/or informational content that would not typically be classified as traditional advertising in that it does not directly pertain to products or services and/or is not directly related to revenue generation.

In accordance with the presently disclosed systems and methods, the advertiser 102 provides the ad content 204 to a multimedia content provider 104, which includes an ad insertion component 122 operative to insert the ad content 204 into the stream of multimedia content 120. For example, the multimedia content 120 and the ad content 204 may include audio content, imagery content, textual content, video content, and/or any other suitable form of content. Further, the multimedia content 120 may constitute music, a video, gaming content, digital still images (including but not limited to those compressed according to the Joint Photographic Experts Group (JPEG) standards), digital image sequences (including but not limited to those compressed according to the Moving Picture Experts Group (MPEG) standards or the Telecommunication Standardization Sector of the International Telecommunication Union (ITU-T) H.26n standards), and/or any other suitable type of multimedia content. In addition, the mobile device 118 may be a mobile phone, a smart phone, a videophone, a netbook, a personal digital assistant (PDA), a camera, a tablet device, an e-reader, a video conferencing device, and/or any other suitable type of mobile device. Alternatively, the mobile device 118, as described and depicted in the present disclosure, can be replaced with or supplemented by an access or recipient component, or an access or recipient device, which may or may not be mobile, with examples of such access or recipient components or devices including but not limited to cable boxes, modem boxes, DVR boxes or devices, digital media receivers, media streamers, digital media adapters, media extenders, gaming consoles or devices, direct TV and other satellite TV devices, IPTV devices, Internet-enabled televisions, media players such as Blu-ray systems, and/or any other suitable type of communications system or device. The network 110 may include a wireless network, a wired network, a telephone network, a private network, a public network, the Internet, and/or any other suitable type of communications network.

Figure 2:
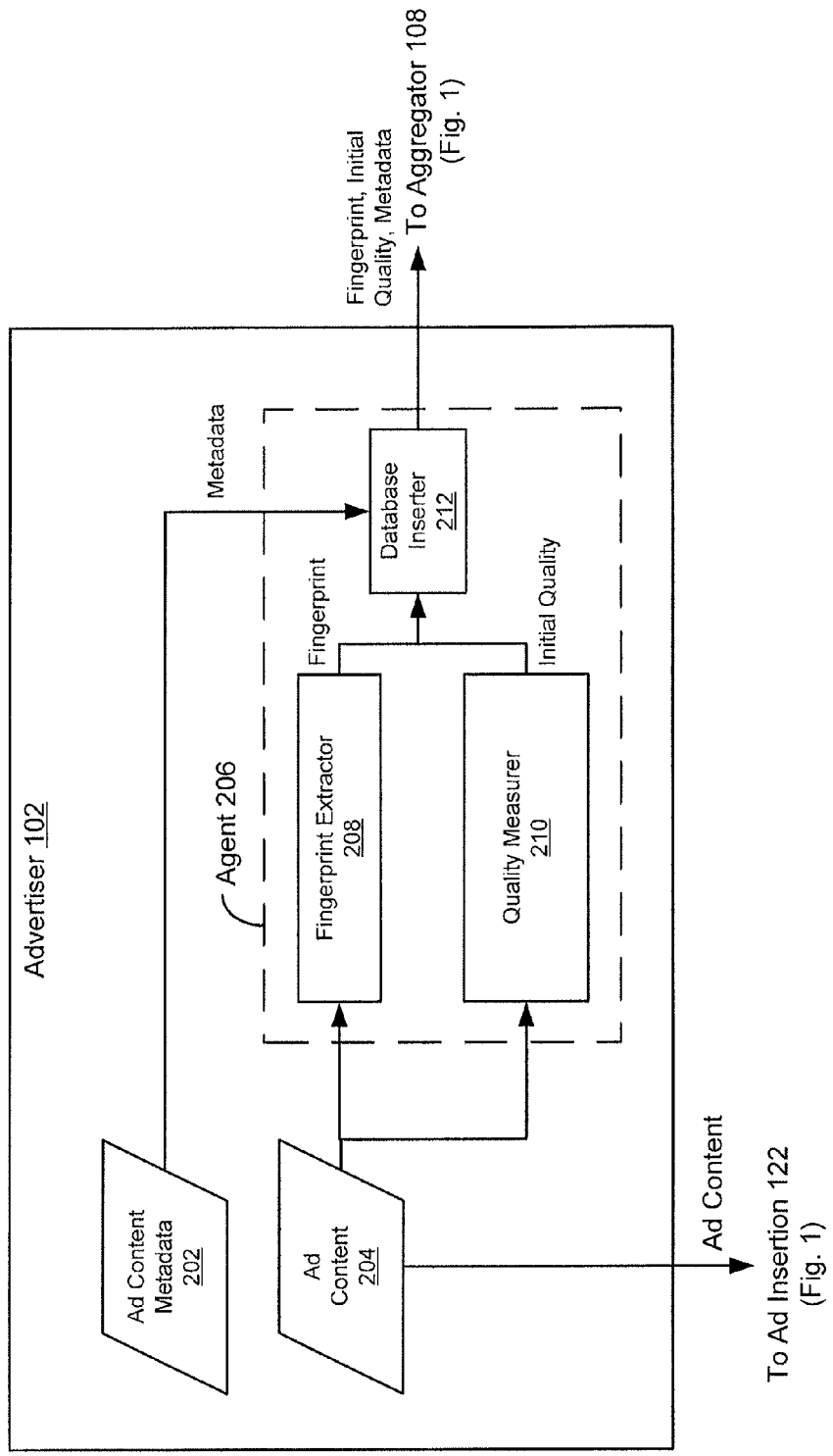
FIG. 2 is a block diagram of an exemplary multimedia content provider, particularly, an advertisement content provider, included in the system of FIG. 1.

In accordance with the presently disclosed systems and methods, the advertiser 102 and the mobile device 118 are each operative to execute a software agent for implementing at least a portion of the functionality of the system 100. As shown in FIG. 2, the advertiser 102 is operative to execute an agent 206 (also referred to herein as the "software agent 206") that includes a plurality of functional components, including a fingerprint extractor 208, a quality measurer 210, and a database inserter 212. The fingerprint extractor 208 is operative to extract a content identifier (referred to herein as the multimedia "fingerprint") from the original version of the ad content 204, and to provide the multimedia fingerprint to the database inserter 212. The quality measurer 210 is operative to obtain an initial quality measure for the ad content 204, and to provide the initial quality measure to the database inserter 212. The advertiser 102 is further operative to provide any descriptive metadata such as ad content metadata 202 (see FIG. 2) that may be available for the ad content 204 to the database inserter 212. The database inserter 212 provides the multimedia fingerprint, the initial quality measure, and the ad content metadata 202 to the content quality aggregator 108 for storage in a fingerprint database 114 (see FIG. 1), a quality database 116 (see FIG. 1), and a metadata database 112 (see FIG. 1), respectively. The multimedia content provider 104 is operative to transmit the stream of multimedia content 120, including the ad content 204 inserted therein, over the network 110 to the mobile device 118.

Figure 3:
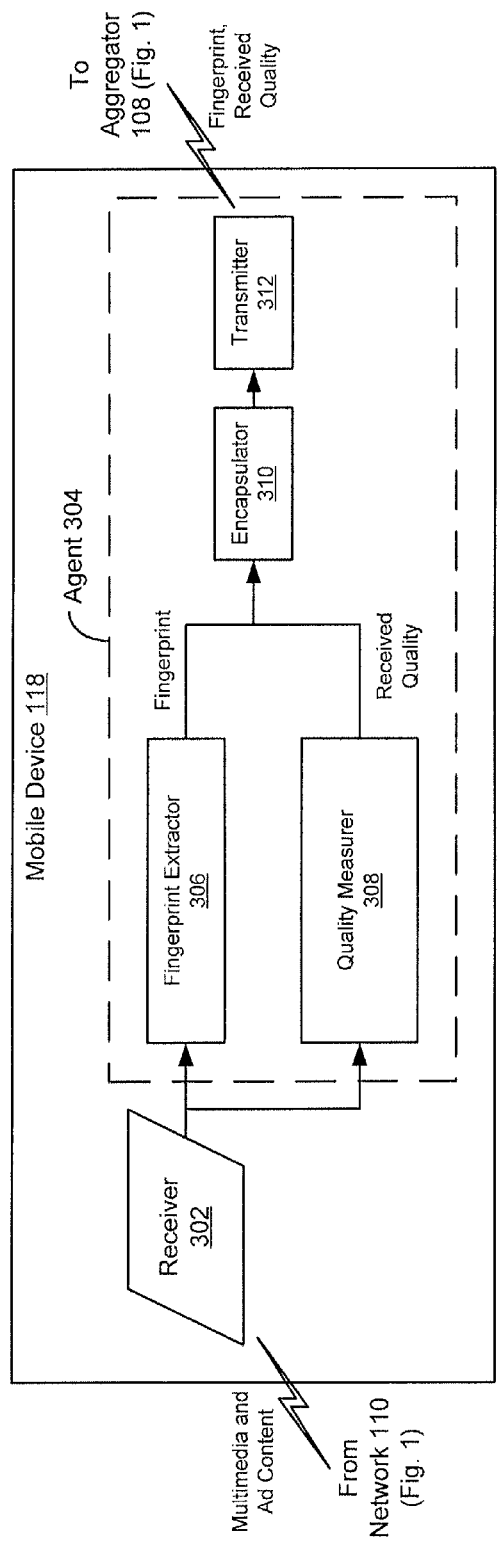
FIG. 3 is a block diagram of an exemplary mobile device included in the system of FIG. 1.

As shown in FIG. 3, the mobile device 118 is operative to receive, over the network 110 via a receiver 302, the multimedia content 120 (see FIG. 1) and the ad content 204 (see FIG. 2) from the multimedia content provider 104. The mobile device 118 is further operative to execute a software agent 304 that includes a plurality of functional components, including a fingerprint extractor 306, a quality measurer 308, an encapsulator 310, and a transmitter 312. The fingerprint extractor 306 is operative to extract the multimedia fingerprint from the received ad content 204, and to provide the multimedia fingerprint to the encapsulator 310. The quality measurer 308 is operative to obtain a measurement of the perceptual quality (referred to herein as the "received quality measure") of the received ad content 204, and to provide the received quality measure to the encapsulator 310. The encapsulator 310 is operative to provide the multimedia fingerprint and the received quality measure in encapsulated form to the transmitter 312, which transmits the encapsulated multimedia fingerprint and received quality measure to the content quality aggregator 108 (see FIG. 1).

Figure 4:
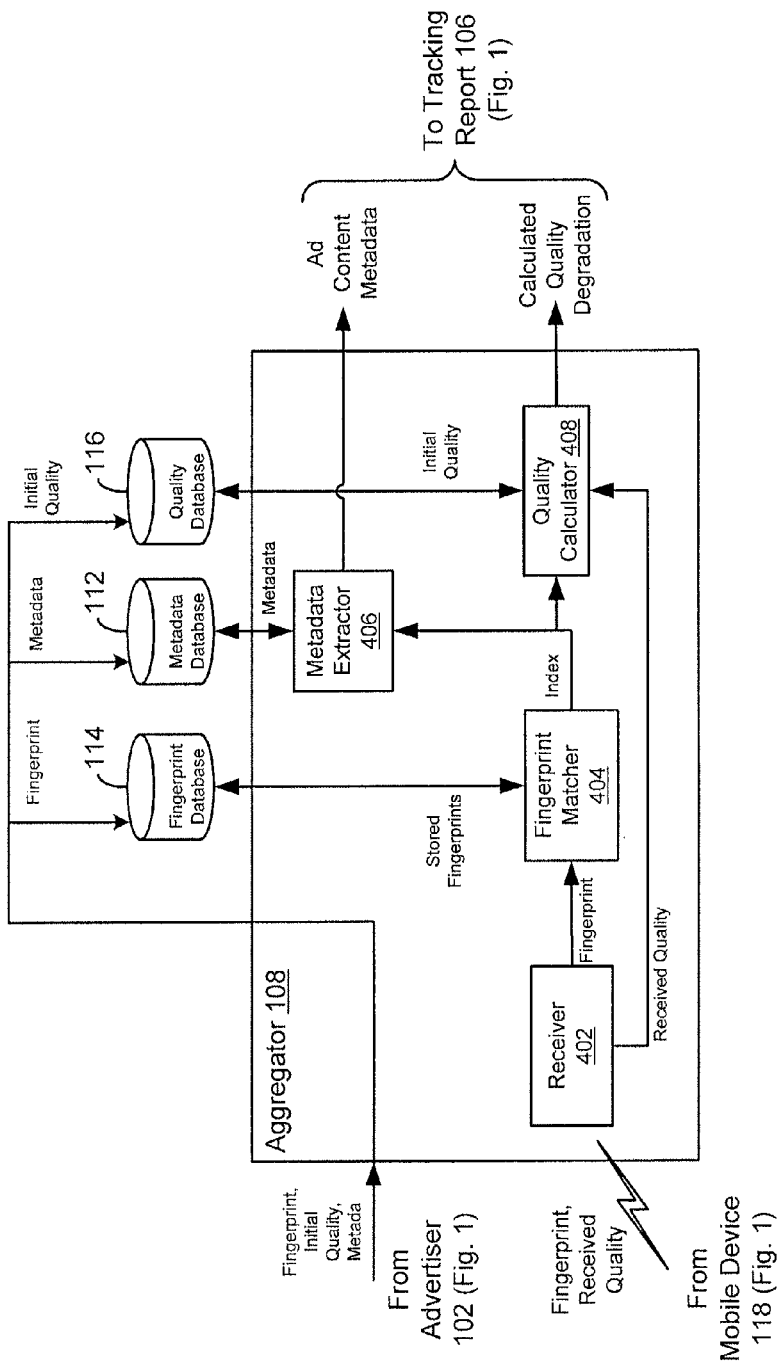
FIG. 4 is a block diagram of an exemplary content quality aggregator included in the system of FIG. 1.

As shown in FIG. 4, the content quality aggregator 108 includes a receiver 402, a fingerprint matcher 404, a metadata extractor 406, and a quality calculator 408. The receiver 402 is operative to receive the multimedia fingerprint and the received quality measure from the mobile device 118, and to provide the multimedia fingerprint and the received quality measure to the fingerprint matcher 404 and the quality calculator 408, respectively. The fingerprint matcher 404 is operative to verify the multimedia fingerprint against one or more multimedia fingerprints stored in the fingerprint database 114. For example, the fingerprint matcher 404 may locate a match for the multimedia fingerprint from among one or more multimedia fingerprints stored in the fingerprint database 114. The fingerprint matcher 404 is further operative to obtain a unique fingerprint index corresponding to the match for the multimedia fingerprint, and to provide that unique fingerprint index to the metadata extractor 406 and the quality calculator 408. In accordance with the presently disclosed systems and methods, the metadata extractor 406 and the quality calculator 408 both use that same unique fingerprint index to retrieve descriptive metadata and quality measures from the metadata database 112 and the quality database 116, respectively. Specifically, the metadata extractor 406 is operative, using the unique fingerprint index, to extract the ad content metadata 202 from the metadata database 112, and the quality calculator 408 is operative, using the unique fingerprint index, to retrieve the initial quality measure for the ad content 204 from the quality database 116. The quality calculator 408 is further operative to calculate or otherwise obtain an estimate of quality degradation for the ad content 204 based on a comparison of the received quality measure against the initial quality measure. The content quality aggregator 108 is operative to provide at least one output containing the ad content metadata 202 and the calculated quality degradation for the ad content 204 in the form of one or more tracking reports 106 (see FIG. 1). In accordance with the disclosed systems and methods, the content quality aggregator 108 may be viewed as a central system that content providers such as the advertiser 102 can call upon to provide such tracking reports for their distributed content. For example, the tracking reports 106 may be used by the advertiser 102 to verify the delivery of the ad content 204 to the mobile device 118, and to determine a level of perceptual quality or quality of experience of the ad content 204 at the mobile device 118. In this way, the system 100 employs multimedia fingerprints in conjunction with initial and received quality measures to allow mapping of the QoE to specific multimedia content, such as the ad content 204 from the advertiser 102.

As described above, the mobile device 118 is operative to execute the quality measurer 308 within the software agent 304 to obtain the received quality measure for the ad content 204. In accordance with the presently disclosed systems and methods, the quality measurer 308 is operative to estimate the received quality measure of the ad content 204 without access to any other copy of the ad content 204. Such quality measures are referred to herein as "no-reference" quality measures. Because such no-reference quality measures typically do not perform very well with regard to estimating perceptual quality, as judged by human viewers, quality measures that require access to certain features (referred to herein as the "reduced-reference" quality features) extracted from multimedia content both before and after transmission of the multimedia content over a network may be employed. Although such reduced-reference quality features may not map directly to quality (also referred to herein as "fidelity"), changes in these quality features from one point to another in the multimedia content can indicate a level of degradation in fidelity, as expressed by the following equation (1):

$$\text{Fidelity} = \text{Visual Quality Degradation} = f(\text{Initial Quality Features}, \text{End-User Quality Features}), \quad (1)$$

where the "Initial Quality Features" correspond to the quality features extracted from the original version of the multimedia content before transmission over a network, and the "End-User Quality Features" correspond to the quality features extracted from the multimedia content after transmission over the network. Accordingly, in equation (1) above, the fidelity of the multimedia content is expressed as a function of reduced-reference quality features, namely, the Initial Quality Features and the End-User Quality Features.

Referring again to FIGS. 1-3, although the quality measurer 210 within the software agent 206 on the advertiser 102, and the quality measurer 308 within the software agent 304 on the mobile device 118, can estimate the initial quality measure and the received quality measure, respectively, for the ad content 204 using no-reference quality measures, the system 100 is configured to employ reduced-reference quality features to provide enhanced performance at estimating perceptual quality. Specifically, the advertiser 102 executes the quality measurer 210 to obtain the initial quality measure for the original version of the ad content 204. The advertiser 102 provides this initial quality measure to the content quality aggregator 108 for storage in the quality database 116. Further, after receiving the ad content 204 over the network 110, the mobile device 118 executes the quality measurer 308 to obtain the received quality measure for the ad content 204, and transmits the received quality measure to the content quality aggregator 108. The content quality aggregator 108 accesses the initial quality measure from the quality database 116, and compares the received quality measure against the initial quality measure to calculate an estimate of the quality degradation of the ad content 204 at the mobile device 118. It is noted that, if, the advertiser 102 is streaming the ad content 204 to the multimedia content provider 104 in real-time while the ad content 204 is being inserted into the multimedia content 120, the advertiser 102 can send the initial quality measures in real-time to the content quality aggregator 108. In accordance with one or more alternative embodiments, if the ad content 204 contains a set of advertisements, then the advertiser 102 can execute the quality measurer 210 on that set of advertisements before the ad content 204 is distributed to the mobile device 118, thereby obtaining a corresponding set of initial quality measures that can be provided to the content quality aggregator 108 for storage in the quality database 116.

It is further noted that, in a system that includes one or more mobile devices, such as the presently disclosed system 100, traditional perceptual quality measurement techniques that employ reduced-reference quality features typically generate too much data—to with, the size of the resulting quality feature set is typically very large, and use of such a large quality feature set in the system 100 would generally require a great deal of data to be sent from the mobile device 118 to the content quality aggregator 108. For example, a known perceptual quality measurement technique that employs reduced-reference quality features, as disclosed by Stephen Wolf and Margaret H. Pinson in the article entitled LOW BANDWIDTH REDUCED REFERENCE VIDEO QUALITY MONITORING SYSTEM, Proceedings of the Workshop on Video Processing and Quality Metrics for Consumer Electronics (VPQM), published in January 2005, results in a quality feature set that generates 10,000 bits per second. While such a quality feature set is generally regarded as being "low bandwidth," it is still too high for most mobile applications. In accordance with the presently disclosed systems and methods, the quality measurer 308 within the software agent 304 on the mobile device 118 estimates the received quality measure of the ad content 204 using a no-reference perceptual quality measurement technique. Like the quality measurer 308 on the mobile device 118, the quality measurer 210 within the software agent 206 on the advertiser 102 also estimates the initial quality measure of the ad content 204 using a no-reference perceptual quality measurement technique. Such no-reference perceptual quality measurement techniques can generate a single perceptual quality measurement value for specific multimedia content. For example, a no-reference perceptual quality measurement technique for images may generate a one byte value for each image. If such a no-reference perceptual quality measurement technique were applied to video, then it would generally result in about 80-250 bits per second for a frame rate range between about 10 and 30 frames per second.

As described above, the content quality aggregator 108 is operative to provide outputs containing the ad content metadata 202 and the calculated quality degradation for the ad content 204 in the form of one or more tracking reports 106. In order for the tracking reports 106 generated by the content quality aggregator 108 to be most useful to the advertiser 102, the tracking reports 106 have to be capable of associating the descriptive metadata and the calculated quality degradation with specific ad content. Further, if reduced-reference quality features are to be employed in the perceptual quality measurement process, then the content quality aggregator 108 has to be capable of identifying the ad content that is currently being operated on by the software agent 304 executing on the mobile device 118, so that it can retrieve the corresponding initial quality measures for that ad content from the quality database 116. It is noted that, although the quality measurer 308 estimates the received quality measure of the ad content 204 using a no-reference quality measure, the content quality aggregator 108 has to be capable of retrieving the corresponding initial quality measure for the ad content 204 from the quality database 116.

In accordance with the presently disclosed systems and methods, multimedia fingerprints are employed to identify multimedia content, such as the ad content 204 provided by the advertiser 102. A multimedia fingerprint is defined herein as a short descriptor of multimedia content (also referred to herein as a "work") that has two properties, specifically, multimedia fingerprints from different works are different, and multimedia fingerprints from degraded versions of the same work are the same or very similar. It is noted that, while extracting a multimedia fingerprint from multimedia content, the multimedia content itself is not modified. Instead, the multimedia content is analyzed to extract a multimedia fingerprint inherent to that multimedia content in a manner that avoids any modification of the multimedia content.

In accordance with the presently disclosed systems and methods, such analysis of multimedia content is part of an "enrollment" process, which is performed by the software agent 206 executing on the advertiser 102. Specifically, during the enrollment process performed by the software agent 206 on the advertiser 102, the fingerprint extractor 208 analyzes the ad content 204 to extract a multimedia fingerprint from the ad content 204, and provides the multimedia fingerprint to the database inserter 212. Further, the quality measurer 210 obtains the initial quality measure for the ad content 204, and provides the initial quality measure to the database inserter 212. In addition, the database inserter 212 receives the ad content metadata 202, which can be a unique commercial identifier for the ad content 204, a textual description of the ad content 204, or any other suitable type of descriptive metadata for the ad content 204. At the end of the enrollment process, the database inserter 212 provides the multimedia fingerprint, the initial quality measure, and the descriptive metadata to the content quality aggregator 108 for storage in the fingerprint database 114, the quality database 116, and the metadata database 112, respectively.

After the mobile device 118 receives the multimedia content 120 and the ad content 204 over the network 110 at the receiver 302, the fingerprint extractor 306, the quality measurer 308, the encapsulator 310, and the transmitter 312 within the software agent 304 executing on the mobile device 118 operate as follows. The fingerprint extractor 306 extracts the multimedia fingerprint from the received ad content 204, and the quality measurer 308 obtains the received quality measure for the ad content 204. The fingerprint extractor 306 and the quality measurer 308 provide the multimedia fingerprint and the received quality measure, respectively, to the encapsulator 310, which provides the multimedia fingerprint and the received quality measure in encapsulated form to the transmitter 312. The transmitter 312 transmits the encapsulated multimedia fingerprint and received quality measure to the content quality aggregator 108.

Referring to FIGS. 1, 2, and 4, after the content quality aggregator 108 receives the multimedia fingerprint and the received quality measure from the mobile device 118 at the receiver 402, the fingerprint matcher 404, the metadata extractor 406, and the quality calculator 408 within the content quality aggregator 108 operate as follows. The fingerprint matcher 404 matches or otherwise verifies the multimedia fingerprint received from the mobile device 118 against the corresponding multimedia fingerprint stored in the fingerprint database 114 during the enrollment process. Further, the fingerprint matcher 404 obtains the unique fingerprint index for the multimedia fingerprint stored in the fingerprint database 114, and provides the unique fingerprint index to the metadata extractor 406 and the quality calculator 408. Using that same unique fingerprint index, the metadata extractor 406 retrieves the ad content metadata 202 from the metadata database 112, and the quality calculator 408 retrieves the initial quality measure for the ad content 204 from the quality database 116.

In accordance with one or more alternative embodiments, instead of employing a multimedia fingerprint to identify the ad content 204, metadata containing identifying information for the ad content 204 can be transmitted along with the ad content 204 to the mobile device 118. For example, such metadata can be carried in the stream of multimedia content 120 via header information. Such metadata can also include some reduced-reference quality features for the ad content 204. In accordance with one or more further alternative embodiments, content identifiers known as multimedia "watermarks" can be used in place of multimedia fingerprints to identify the ad content 204. For example, techniques for implementing multimedia watermarks are disclosed in U.S. patent application Ser. No. 12/623,478 entitled MULTIPLE WATERMARKS FOR FIDELITY ASSESSMENT filed Nov. 23, 2009, which is assigned to the same assignee of the present application, and which is hereby incorporated herein by reference in its entirety. Specifically, before the ad content 204 is inserted into the stream of multimedia content 120, the ad content 204 is "watermarked," which generally involves making modifications to the ad content 204 such that the changes are not perceptible by a human being, but are detectable by a computer. Such modifications can be used to embed a watermark comprising predetermined identifying information into the ad content 204. For example, one technique for implementing multimedia watermarks can be used to embed identifying information directly into the ad content 204. In this case, the software agent 304 on the mobile device 118 may be provided with a multimedia watermark detector (not shown), which can recover the identifying information from the ad content 204, and forward it to the content quality aggregator 108. Another technique for implementing multimedia watermarks can be used to embed a unique identifier into the ad content 204, and to store the unique identifier along with identifying information for the ad content 204 in a database (not shown) that the content quality aggregator 108 can access. In this case, the multimedia watermark embedded into the ad content 204 carries this unique identifier rather than the entirety of the identifying information. The mobile device 118 can use the multimedia watermark detector within the software agent 304 to recover the unique identifier from the ad content 204, and send this unique identifier to the content quality aggregator 108, which, in turn, can use it to look up the full identifying information for the ad content 204 stored in the database.

The presently disclosed systems and methods of tracking multimedia content transmitted over at least one network to one or more mobile devices will be further understood with reference to the following illustrative example and FIGS. 1-4. In this illustrative example, perceptual quality measurements of advertisement content, such as the ad content 204, are employed, using reduced-reference quality features of the ad content 204. Further, content identification techniques involving multimedia fingerprints are employed in conjunction with the perceptual quality measurements to track the delivery and the received quality of the ad content 204, which can include audio, imagery (still or moving), video (audio and moving imagery), or any other suitable form of multimedia content. It is noted that such multimedia fingerprints and reduced-reference quality features may be transmitted from the end-user client device, such as the mobile device 118, to the content quality aggregator 108 in a wireless and/or wired fashion. Similarly, multimedia content containing the ad content 204 may be transmitted from the multimedia content provider 104 to the mobile device 118 in a wired and/or wireless fashion.

Before the multimedia content provider 104 distributes the stream of multimedia content 120 containing the ad content 204 to the mobile device 118, the advertiser 102 subjects the ad content 204 to the enrollment process, which involves fingerprint extraction, an objective perceptual quality measurement, and database insertion. It is noted that the fingerprint extraction and the objective perceptual quality measurement are independent functions, each of which takes the ad content 204 as input. In the enrollment process, the fingerprint extractor 208 within the software agent 206 on the advertiser 102 generates a short descriptor (the multimedia fingerprint) from the ad content 204, such that multimedia fingerprints extracted from different works are significantly different (thereby providing what is referred to herein as "discriminability"), and multimedia fingerprints extracted from degraded versions of a work are the same or very similar to the multimedia fingerprints extracted from the pre-distorted versions of the work (thereby providing what is referred to herein as "robustness"). Techniques for extracting multimedia fingerprints can vary in performance based on their discriminability and robustness, and based on their computational costs in complexity and the size of the resulting multimedia fingerprint. One technique for extracting multimedia fingerprints is disclosed by R. Mohan in the article entitled VIDEO SEQUENCE MATCHING, Proceedings of International Conference on Acoustics, Speech and Signal Processing, vol. 6, pp. 3697-3700, published in 1998. The fingerprint extraction technique disclosed by R. Mohan takes a region-based approach based on ordinal ranking. Specifically, each frame of a video sequence is partitioned into a 4×4 grid of blocks, the average pixel value for each block is computed, and the blocks are sorted by the average values. The ordinal rank of each block is assigned to the block as a block signature. The multimedia fingerprint of the frame is the raster scan concatenation of the block ranks. The size of the multimedia fingerprint of the frame is sixteen 4-bit numbers, or 64-bits.

In this illustrative example, the quality measurer 210 within the software agent 206 on the advertiser 102 continues the enrollment process using a class of perceptual quality measurements that employs reduced-reference quality features. In this class of perceptual quality measurements, a set of quality features is extracted from both the source version of the ad content 204 at the advertiser 102, and the destination version of the ad content 204 at the mobile device 118. These two sets of quality features are compared to derive the perceptual quality of the destination version of the ad content 204, relative to the perceptual quality of the original source version of the ad content 204. It is noted that the amount of perceptual quality measurement data sent from the mobile device 118 to the content quality aggregator 108 has to be small. While any suitable perceptual quality measurement technique employing reduced-reference quality features may be employed, such a technique may be incapable of meeting this reduced size requirement for the perceptual quality measurement data. Another class of perceptual quality measurements, referred to herein as no-reference perceptual quality measurements, may be employed to extract the quality features from the ad content 204. Such no-reference perceptual quality measurement techniques typically produce a single result, which, in this illustrative example, can be interpreted as a reduced-reference quality feature. The no-reference quality measure at the mobile device 118 is compared to the no-reference quality measure at the advertiser 102 to estimate the degradation in perceptual quality of the ad content 204 at the mobile device 118. Such degradation in perceptual quality may be due to the transmission channel between the multimedia content provider 104 and the mobile device 118.

Techniques for obtaining no-reference quality measures for multimedia content are disclosed in U.S. patent application Ser. No. 12/706,165 entitled A UNIVERSAL BLURRINESS MEASUREMENT APPROACH FOR DIGITAL IMAGERY (filed Feb. 16, 2010 and assigned to the same assignee of the present application) and U.S. patent application Ser. No. 12/757,389 entitled BLIND BLOCKING ARTIFACT MEASUREMENT APPROACHES FOR DIGITAL IMAGERY (filed Apr. 9, 2010 and assigned to the same assignee of the present application), both of which are hereby incorporated herein by reference in their entirety. In this illustrative example, both the quality measurer 210 within the software agent 206 on the advertiser 102 and the quality measurer 308 within the software agent 304 on the mobile device 118 are operative to employ such no-reference perceptual quality measurement techniques to obtain no-reference quality measures of blurriness and/or blockiness in the ad content 204. It is noted that blockiness and blurriness are typical impairments that can be introduced into multimedia content by over-compression. Blockiness can also be introduced into multimedia content as a result of packet loss in the transmission channel. In this illustrative example, the quality measurer 210 and the quality measurer 308 each effectively take a luminance picture of the ad content 204 comprising a still image or single frame from a motion sequence, and independently calculate the blurriness measurement and the blockiness measurement, thereby obtaining two perceptual quality measurement values. The output of each of the quality measurers 210, 308 is a vector of quality features containing these two perceptual quality measurement values.

The database inserter 212 within the software agent 206 on the advertiser 102 further continues the enrollment process by providing the multimedia fingerprint from the fingerprint extractor 208, the initial quality measure from the quality measurer 210, and the ad content metadata 202 to the content quality aggregator 108 for storage in the fingerprint database 114, the quality database 116, and the metadata database 112, respectively. It is noted that the contents of the ad content metadata 202 is dependent on the target application. In this illustrative example, the ad content metadata 202 can uniquely describe the ad content 204, using a textual description, a unique identifier, or a key to a database containing such descriptive information. It is further noted that the term "database" is employed herein to refer to any suitable type of data storage, formatted in such a way as to lend itself to efficient data retrieval.

In this illustrative example, the fingerprint database 114 contains a list of multimedia fingerprints, each being associated with a unique fingerprint index. The database inserter 212 adds multimedia fingerprints from the fingerprint extractor 208 to the list of multimedia fingerprints in the fingerprint database 114 via the content quality aggregator 108. In addition, the database inserter 212 creates a number of hash tables, each containing a list of hash values. Associated with each hash value is a list of indices pointing back to the multimedia fingerprints stored in the fingerprint database 114. The database inserter 212 applies the various hash functions to the multimedia fingerprint to obtain a set of hash values, and adds the unique fingerprint index to the appropriate entries in the corresponding hash tables. Such use of hash tables by the database inserter 212 is further described below with reference to the fingerprint matcher 404. The database inserter 212 also provides, via the content quality aggregator 108, the ad content metadata 202 and the initial quality measure to the metadata database 112 and the quality database 116, respectively, along with the unique fingerprint index, which is subsequently used by the content quality aggregator 108 to retrieve the ad content metadata 202 and the initial quality measure from the respective databases.

After the multimedia content provider 104 distributes the stream of multimedia content 120 containing the ad content 204 to the mobile device 118, the mobile device 118 subjects the ad content 204 to the perceptual quality measurement process, which involves fingerprint extraction, objective perceptual quality measurement, encapsulation, and transmission. In this illustrative example, this perceptual quality measurement process can be applied to every input image, every frame from an input image sequence, every frame from an input audio, or every frame or field from an input video, contained in the ad content 204. In one or more alternative embodiments, this perceptual quality measurement process can be applied to a subset of input frames or fields of the ad content 204 to reduce the computational and communications resources required at the mobile device 118. In the perceptual quality measurement process, the fingerprint extractor 306 and the quality measurer 308 within the software agent 304 on the mobile device 118 are functionally equivalent to the fingerprint extractor 208 and the quality measurer 210, respectively, employed in the enrollment process. It is noted, however, that the specific implementations of the fingerprint extractor 208, the quality measurer 210, the fingerprint extractor 306, and the quality measurer 308, may differ due to the different computational operating environments of the advertiser 102 and the mobile device 118. For example, the mobile device 118 performing the perceptual quality measurement process may have memory usage constraints, processor usage constraints, and/or time constraints that are different from those of the advertiser 102.

The encapsulator 310 within the software agent 304 on the mobile device 118 encapsulates the outputs of the fingerprint extractor 306 and the quality measurer 308 into a single data unit in preparation for transmission to the content quality aggregator 108. In this illustrative example, such encapsulation involves the creation of a text string specifying the values of the multimedia fingerprint and the received quality measure along with a time indicator, such as a frame number, for any content whose domain extends over time, such as motion imagery content, audio content, or video content. It is noted that the encapsulator 310 does not have to perform such encapsulation of the multimedia fingerprint and the received quality measure immediately. Instead, the fingerprint and received quality measure outputs resulting from a number of consecutive inputs can be stored and then encapsulated as a block of data. It is further noted that the encapsulator 310 can encapsulate the fingerprint or received quality measure data from each input individually.

After the multimedia fingerprint and the received quality measures are encapsulated, the transmitter 312 within the software agent 304 on the mobile device 118 transmits the encapsulated data to the content quality aggregator 108. It is noted that the transmitter 312 does not have to perform such data transmission immediately. Instead, the transmitter 312 can save the encapsulated data, and transmit a block of encapsulated data to the content quality aggregator 108 periodically. It is further noted that the transmitter 312 can transmit each encapsulated data string individually.

The specific method and protocol used by the transmitter 312 for transmitting the encapsulated data to the content quality aggregator 108 is dependent on the characteristics of the transmission channel between the multimedia content provider 104 and the mobile device 118. In this illustrative example, the transmission channel can be an IEEE 802.11 wireless Internet Protocol link. In this case, the transmitter 312 transmits the encapsulated data in a UDP packet. Specifically, during an initialization stage, the transmitter 312 sends a connection request to the content quality aggregator 108 via the TCP/IP protocol. The content quality aggregator 108 creates a transient session identifier (also referred to herein as the "session ID") that will be valid for a certain communication period, and will be used only by the transmitter 312 during that communication period. It is noted that the content quality aggregator 108 may be receiving encapsulated data from a number of transmitters during any period of time, and that the session ID will allow the content quality aggregator 108 to separate the incoming data by transmitter. After the transmitter 312 sends a connection request to the content quality aggregator 108 and the content quality aggregator 108 creates a session ID, the content quality aggregator 108 sends a message back to the transmitter 108 indicating that the connection has been accepted, and providing the session ID. At this point the TCP/IP connection is closed. All encapsulated multimedia fingerprints and quality feature measures are transmitted to the content quality aggregator 108 via the UDP protocol, where the UDP packet includes the session ID. The communication period ends when the transmitter 312 sends a TCP/IP message to the content quality aggregator 108 requesting an end of the session, or when the elapsed time since the last received UDP packet with a given session ID exceeds a predefined timeout value. In one or more alternative embodiments, the encapsulated multimedia fingerprints and quality feature measures can be transmitted to the content quality aggregator 108 via a TCP/IP connection, or via an http connection.

The encapsulated, multimedia fingerprints and quality feature measures transmitted by the transmitter 312 within the mobile device 118 are received at the receiver 402 within the content quality aggregator 108. The receiver 402 separates out the multimedia fingerprint information from the perceptual quality measurement information in the received message. The fingerprint matcher 404 uses the multimedia fingerprint to identify the ad content 204, generating a unique fingerprint index. The unique fingerprint index is used to recover the ad content metadata 202 from the metadata database 112, as well as the initial quality measure from the quality database 116. The quality calculator 408 uses the initial quality measure as a reduced-reference quality feature for calculating the quality degradation of the ad content 204 at the mobile device 118.

In this illustrative example, the fingerprint matcher 404 can employ any suitable technique for performing multimedia fingerprint matching. For example, such multimedia fingerprint matching can involve what is referred to herein as a "nearest neighbor search." Specifically, for a newly extracted multimedia fingerprint from an unknown work, the nearest neighbor search includes searching through the fingerprint database 114 to find the best match. It is noted, however, that the nearest neighbor search can become computationally difficult when the multimedia fingerprints become large, resulting in what is known as a "high dimensional" nearest neighbor search. To mitigate such computational difficulties, the nearest neighbor search can be modified to perform an "approximate nearest neighbor search," which includes searching through the fingerprint database 114 to find the nearest neighbor with high probability, while leaving open the possibility that occasionally a multimedia fingerprint will be identified in the fingerprint database 114 that is not the best match. One such approximate nearest neighbor search employs Locality-Sensitive Hashing (LSH), which is disclosed by P. Indyk and R. Motwani in the article entitled APPROXIMATE NEAREST NEIGHBORS: TOWARDS REMOVING THE CURSE OF DIMENSIONALITIES, Proceedings of the 30th Symposium on Theory of Computing, pp. 604-613, published in 1998. The Locality-Sensitive Hashing (LSH) technique has subsequently been refined by A. Gionis, P. Indyk, and R. Motwani in the article entitled SIMILARITY SEARCH IN HIGH DIMENSIONS VIA HASHING, Proceedings of the 25th International Conference on Very Large Data Bases (VLDB), pp. 518-529, published in 1999.

The Locality-Sensitive Hashing (LSH) technique relies on the use of hash functions that map similar, high-dimensional vectors into the same hash value. The LSH technique assumes that works that are very similar will generate multimedia fingerprints that are also very similar, and that multimedia fingerprints that are very similar will lead to hash values that are identical. To implement the LSH technique, a list of multimedia fingerprints is provided that have previously been subjected to the enrollment process. For each multimedia fingerprint, the hash value is calculated, and a list of unique hash functions is created. Each unique hash function appears in the list only once. For each unique hash function in the list, a list of indices is associated back into the list of multimedia fingerprints. Further, for each hash value, the indices indicate which multimedia fingerprints generated that hash value. If the unique hash functions are designed well, then all of the multimedia fingerprints associated with a particular hash value will be similar. It is noted that the database inserter 212 creates a table of hash values and associated indices during the enrollment process.

During the fingerprint matching process, the fingerprint matcher 404 receives the multimedia fingerprint from the receiver 402, and applies the corresponding hash functions to the multimedia fingerprint to obtain the hash value. The fingerprint matcher 404 searches the table of hash values and associated indices to find the entry for which the hash value exactly matches the hash value obtained for the multimedia fingerprint. The fingerprint matcher 404 retrieves the associated indices, which identify a short list of multimedia fingerprints that are likely to match the received multimedia fingerprint. The fingerprint matcher 404 compares the received multimedia fingerprint to each of the multimedia fingerprints in the list, and identifies, as the nearest neighbor, the multimedia fingerprint in the list that is the closest match to the received multimedia fingerprint.

The LSH technique described above significantly reduces the number of multimedia fingerprints that must be compared to find the nearest neighbor. Instead of comparing the received multimedia fingerprint to all of the multimedia fingerprints in the fingerprint database 114, the fingerprint matcher 404 just compares the received multimedia fingerprint to those multimedia fingerprints that hash to the same value. It is noted that the size of the search space can be reduced by repeatedly applying the LSH technique with multiple different hash functions. During the enrollment process, each hash function used will generate a table of hash values, where each hash value has an associated list of multimedia fingerprint indices. During fingerprint matching, there will be a match in each table of hash values, and thus there will be a number of sets of multimedia fingerprint indices. Assuming that the real nearest neighbor is in all of these sets of multimedia fingerprint indices, the fingerprint matcher 404 analyzes the intersection of these sets, and performs multimedia fingerprint comparisons to multimedia fingerprints that fall into this intersection set. Once the fingerprint matcher 404 finds the correct multimedia fingerprint, the fingerprint matcher 404 provides, as an output, the unique fingerprint index associated with that multimedia fingerprint. The unique fingerprint index for the multimedia fingerprint is then employed by the metadata extractor 406 and the quality calculator 408 as the content identifier for the ad content 204.

In this illustrative example, the metadata extractor 406 employs the unique fingerprint index to retrieve the ad content metadata 202 from the metadata database 112. The quality calculator 408 also employs the unique fingerprint index to retrieve the initial quality measure for the ad content 204 from the quality database 116. As described above, the ad content metadata 202 and the initial quality measure were stored in the metadata database 112 and the quality database 116, respectively, during the enrollment process. The quality calculator 408 compares the received quality measure against the initial quality measure to calculate the quality degradation of the ad content 204 at the mobile device 118. Specifically, the quality calculator 408 compares the received quality measure against the initial quality measure using a difference operation, as expressed by the following equation (2):

$$\text{Reported Quality} = \text{Maximum Quality Score} - \text{alpha} * (\max(0, \text{Reference Quality} - \text{Received Quality})), \quad (2)$$

where the "Maximum Quality Score" is equal to 100, the "Reference Quality" corresponds to the initial quality measure, the "Received Quality" corresponds to the received quality measure, and "alpha" has a value that can be determined experimentally to yield calculated quality degradation scores that correlate with subjective assessments of quality. The content quality aggregator 108 provides the ad content metadata 202 and the calculated quality degradation for the ad content 204 in the tracking reports 106, which can be used by the advertiser 102 to verify the delivery of the ad content 204 at the mobile device 118, and to determine a level of perceptual quality or quality of experience of the ad content 204 at the mobile device 118.

Figure 5:
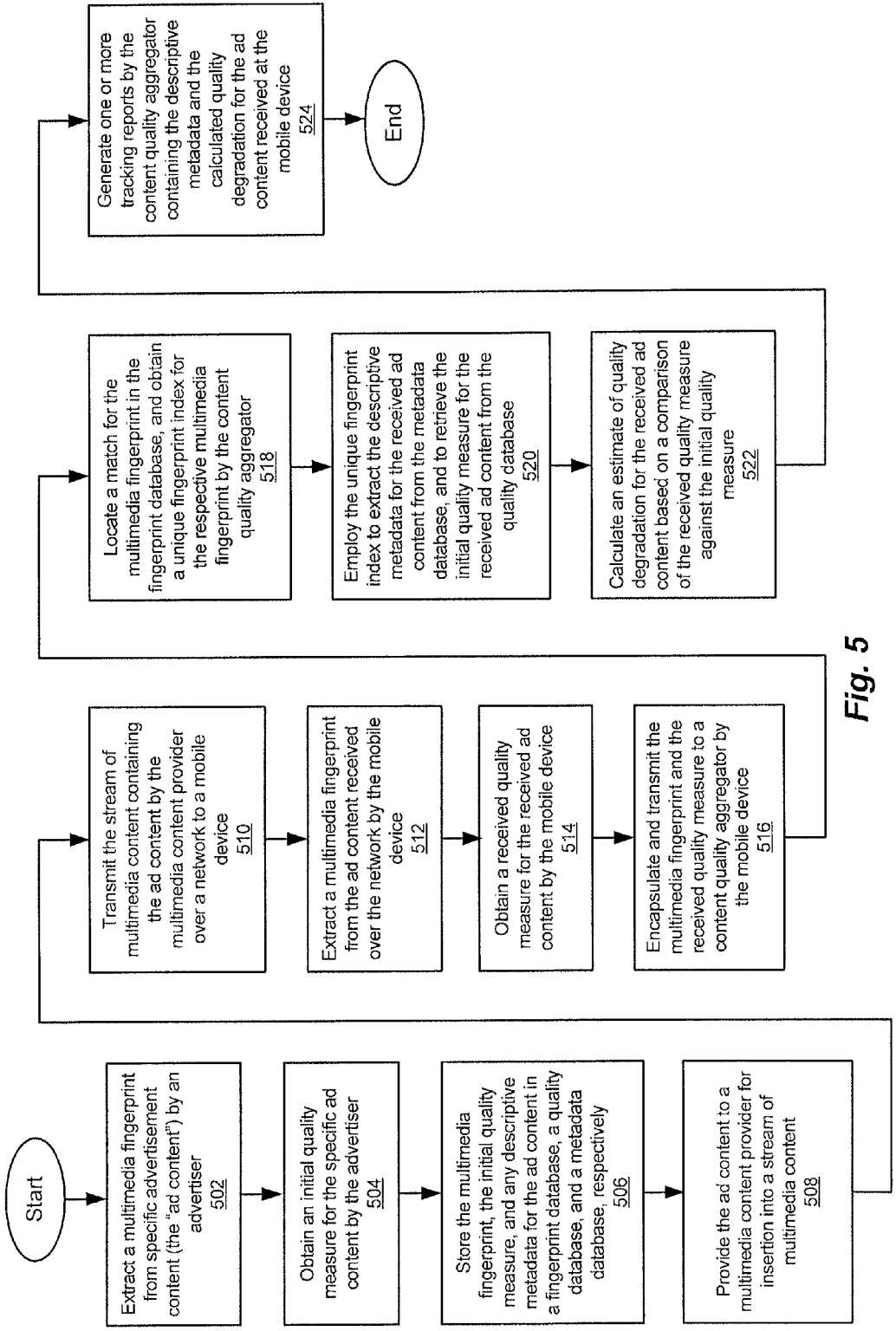
FIG. 5 is a flow diagram of an exemplary method of tracking multimedia content transmitted over a network to a mobile device, according to an exemplary embodiment of the present application.

A method of tracking ad content provided by an advertiser, and transmitted over a network to a mobile device, is described below with reference to FIG. 5. As depicted in step 502, a multimedia fingerprint is extracted from specific advertisement content (the "ad content") by an advertiser. As depicted in step 504, an initial quality measure is obtained for the specific ad content by the advertiser. As depicted in step 506, the multimedia fingerprint, the initial quality measure, and any descriptive metadata for the ad content are stored in a fingerprint database, a quality database, and a metadata database, respectively. As depicted in step 508, the ad content is provided to a multimedia content provider for insertion into a stream of multimedia content. As depicted in step 510, the stream of multimedia content containing the ad content is transmitted by the multimedia content provider over a network to a mobile device. As depicted in step 512, a multimedia fingerprint is extracted from the ad content received over the network by the mobile device. As depicted in step 514, a received quality measure is obtained for the received ad content by the mobile device. As depicted in step 516, the multimedia fingerprint and the received quality measure are encapsulated and transmitted to a content quality aggregator by the mobile device. As depicted in step 518, a match for the multimedia fingerprint is located in the fingerprint database, and a unique fingerprint index for the respective multimedia fingerprint is obtained, by the content quality aggregator. As depicted in step 520, the unique fingerprint index is employed by the content quality aggregator to extract the descriptive metadata for the received ad content from the metadata database, and to retrieve the initial quality measure for the received ad content from the quality database. As depicted in step 522, an estimate of quality degradation for the received ad content is calculated based on a comparison of the received quality measure against the initial quality measure. As depicted in step 524, one or more tracking reports are generated by the content quality aggregator containing the descriptive metadata and the calculated quality degradation for the ad content received at the mobile device. Such tracking reports can be used by the advertiser to verify delivery of the ad content to the mobile device, and to determine a level of perceptual quality of the ad content at the mobile device.

Having described the above illustrative embodiments of the presently disclosed systems and methods of tracking multimedia content transmitted over at least one network to one or more mobile devices, other alternative embodiments or variations may be made. For example, it was described above that the quality measurer 210 (see FIG. 2) within the software agent 206 on the advertiser 102, and the quality measurer 308 (see FIG. 3) within the software agent 304 on the mobile device 118, employ no reference information while performing the perceptual quality measurement processes. In accordance with one or more alternative embodiments, the quality measurers 210 and 308 each may employ certain reduced-reference quality features while performing the respective perceptual quality measurement processes. For example, the quality measurer 210 within the advertiser 102 may obtain certain reduced-reference quality features from the ad content 204 (see FIG. 2), and may employ that reduced-reference quality feature information as the initial quality measure for the ad content 204. Further, the advertiser 102 may transmit that reduced-reference quality feature information to the content quality aggregator 108, so long as the amount of reduced-reference quality feature information does not exceed the available communication bandwidth between the advertiser 102 and the content quality aggregator 108. Similarly, the quality measurer 308 within the mobile device 118 may obtain certain reduced-reference quality features from the ad content received over the network 110 at the mobile device 118, and may employ that reduced-reference quality feature information as the received quality measure for the received ad content. Further, the mobile device 118 may transmit that reduced-reference quality feature information to the content quality aggregator 108, so long as the amount of reduced-reference quality feature information does not exceed the available communication bandwidth between the mobile device 118 and the content quality aggregator 108. The content quality aggregator 108 may then employ the reduced-reference quality feature information corresponding to the initial quality measure and the received quality measure to obtain a level of quality degradation of the ad content 204 at the mobile device 118.

In addition, it was described above that the system 100 may be employed in target applications involving the advertiser 102 and the mobile device 118 for tracking the ad content 204 provided by the advertiser 102, and transmitted over the network 110 to the mobile device 118. For example, the system 100 may be employed to track mobile video advertising content provided by the advertiser 102, and to correlate against the quality of experience for specific ads at the mobile device 118. It is noted that the system 100 can also be employed to collect other ad metrics, including, but not limited to, the number of times specific ads were distributed over the network 110 to the mobile device 118, the time of day such ads were distributed to the mobile device 118, the identity of the carrier network, and/or the identify of the mobile device 118, for subsequent use in advanced content analysis applications.

In accordance with one or more alternative embodiments, the system 100 may be employed without undue experimentation in target applications involving CDN vendors to validate SLA conformance to respective mobile devices, verifying that mobile video quality expectations were met, and that the correct content was delivered to the proper mobile devices. The system 100 may also be employed without undue experimentation in target applications involving mobile video content providers to monetize "snackable" mobile video content, enabling the determination of whether or not to charge for specific video content based on the user's quality of experience, and helping to build customer satisfaction and loyalty while collecting intelligence on individual viewing habits for targeting promotional offers. As employed herein, such snackable mobile video content refers to short form video clips produced specifically for viewing on a mobile device. The system 100 may further be employed without undue experimentation in target applications involving ratings companies to collect mobile video quality and usage metrics by monitoring patterns of mobile video usage for specific multimedia content, correlating with the quality of experience, analyzing the relationships and impacts of video quality with levels of usage and customer stickiness, and tracking demographic metrics and trends. In addition, the system 100 may be employed without undue experimentation in target applications involving mobile carriers to perform bandwidth management, enabling real-time throttling of bandwidth versus quality for mobile video by tracking specific content, correlating with the quality of experience, and helping to efficiently manage tradeoffs between network resource consumption and customer expectations.

It will be appreciated by those of ordinary skill in the art that one or more of the functions necessary to implement the above-described systems and methods of tracking multimedia content transmitted over at least one network to one or more mobile devices can be embodied—in whole or in part—in hardware, software, or some suitable combination of hardware and software, using programmable micro-controllers, microprocessors, digital signal processors, and/or logic arrays, read-only memory (ROM), random access memory (RAM), CD-ROM, personal computers, server computers, client computers, computer programs, program, instructions stored on processor readable media, and computer displays, wire-based, optical fiber-based, or wireless communications networks, media, and/or devices, and/or any other suitable hardware and/or software components and/or devices.

It will be further appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of determining a level of perceptual quality degradation of multimedia content as received at at least one end-user mobile device over at least one network, the method comprising:

receiving, at a computerized central system from a multimedia content provider, a first content identifier for the multimedia content, and a first perceptual quality measure of at least blurriness or blockiness in the multimedia content, the first perceptual quality measure being representative of perceptual quality of the multimedia content prior to its transmission over the at least one network;

storing, by the computerized central system, the first content identifier and the first perceptual quality measure in a content identifier database and a perceptual quality measure database, respectively;

receiving, at the computerized central system, a request for a session with the computerized central system from an end-user mobile device;

in response to the request for the session, transmitting a session ID for the session by the computerized central system to the end-user mobile device over at least one transmission path to establish the session with the end-user mobile device;

during the session with the end-user mobile device:
receiving, at the computerized central system from the end-user mobile device over the at least one transmission path, at least one packet including (1) a second content identifier for the multimedia content, (2) a second perceptual quality measure of at least blurriness or blockiness in the multimedia content, and (3) the session ID, the second perceptual quality measure being generated by the end-user mobile device and being representative of the perceptual quality of the multimedia content subsequent to being transmitted over the at least one network and received at the end-user mobile device;

based on the session ID included in the at least one packet, separating the at least one packet from a plurality of other packets received at the computerized central system from one or more other end-user mobile devices;

having separated the at least one packet from the plurality of other packets:
  verifying, by the computerized central system, the second content identifier included in the at least one packet against the first content identifier stored in the content identifier database;
  having verified the second content identifier included in the at least one packet against the first content identifier, retrieving, by the computerized central system, the first perceptual quality measure for the multimedia content from the perceptual quality measure database;
  comparing, by the computerized central system, the first perceptual quality measure to the second perceptual quality measure included in the at least one packet; and
  based at least in part on a result of having compared the first perceptual quality measure to the second perceptual quality measure included in the at least one packet, determining, by the computerized central system, a level of the perceptual quality degradation of the multimedia content at the end-user mobile device;

providing, by the computerized central system to the multimedia content provider, a report of successful or unsuccessful delivery of the multimedia content to the end-user mobile device based at least on the level of the perceptual quality degradation of the multimedia content at the end-user mobile device; and in response to the providing of the report to the multimedia content provider, causing a mapping of perceptual quality to provider-specific content to be established, the provider-specific content including the multimedia content transmitted over the at least one network and received at the end-user mobile device.

2. The method of claim 1 further comprising:
responsive to the verifying of the second content identifier against the first content identifier, obtaining a content identifier index for the multimedia content, wherein the retrieving of the first perceptual quality measure from the perceptual quality measure database includes retrieving the first perceptual quality measure from the perceptual quality measure database using the content identifier index.

3. The method of claim 1 further comprising:
receiving, at the computerized central system, descriptive metadata for the multimedia content from the multimedia content provider; and
storing, by the computerized central system, the descriptive metadata in a metadata database.

4. The method of claim 3 further comprising:
responsive to the verifying of the second content identifier against the first content identifier, retrieving, by the computerized central system, the descriptive metadata for the multimedia content from the metadata database.

5. The method of claim 4 further comprising:
responsive to the verifying of the second content identifier against the first content identifier, obtaining a content identifier index for the multimedia content, wherein the retrieving of the descriptive metadata for the multimedia content from the metadata database includes retrieving the descriptive metadata for the multimedia content from the metadata database using the content identifier index.

6. The method of claim 4 wherein the providing of the level of perceptual quality degradation of the multimedia content includes providing the level of perceptual quality degradation of the multimedia content in association with the descriptive metadata for the multimedia content.

7. The method of claim 1 wherein the first content identifier and the second content identifier correspond to a first multimedia fingerprint and a second multimedia fingerprint, respectively, for the multimedia content, and wherein the verifying of the second content identifier against the first content identifier includes verifying the second multimedia fingerprint against the first multimedia fingerprint.

8. The method of claim 1 wherein the first content identifier and the second content identifier correspond to first identifying metadata and second identifying metadata, respectively, for the multimedia content, and wherein the verifying of the second content identifier against the first content identifier includes verifying the first identifying metadata against the second identifying metadata.

9. The method of claim 1 wherein the first content identifier and the second content identifier correspond to a first multimedia watermark and a second multimedia watermark, respectively, for the multimedia content, and wherein the verifying of the second content identifier against the first content identifier includes verifying the second multimedia watermark against the first multimedia watermark.

10. A method of determining a level of perceptual quality degradation of multimedia content transmitted by a multimedia content provider over at least one network, for use with a central system operative to obtain the level of the perceptual quality degradation of the multimedia content as received at at least one computerized end-user mobile device over the at least one network, the method comprising:
receiving the multimedia content at a computerized end-user mobile device over the at least one network, a first content identifier for the multimedia content and a first perceptual quality measure of at least blurriness or blockiness in the multimedia content being stored in at least one database associated with the central system, the first perceptual quality measure being representative of perceptual quality of the multimedia content prior to its transmission over the at least one network;
generating a second content identifier for the received multimedia content by the computerized end-user mobile device;
generating a second perceptual quality measure of at least blurriness or blockiness in the received multimedia content by the computerized end-user mobile device, the second perceptual quality measure being representative of the perceptual quality of the multimedia content subsequent to being transmitted over the at least one network and received at the computerized end-user mobile device;
transmitting, by the computerized end-user mobile device to the central system, a request for a session with the central system;

having transmitted the request for the session, receiving, at the computerized end-user mobile device, a session ID for the session from the central system over at least one transmission path between the central system and the computerized end-user mobile device; and providing, by the computerized end-user mobile device during the session over the at least one transmission path, at least one packet including (1) the second content identifier; (2) the second perceptual quality measure, and (3) the session ID to the central system for:

based on the session ID included in the at least one packet, separating the at least one packet from a plurality of other packets received at the central system from one or more other end-user mobile devices;

having separated the at least one packet from the plurality of other packets:

verifying, by the central system, the second content identifier included in the at least one packet against the first content identifier stored in the at least one database;

having verified the second content identifier included in the at least one packet against the first content identifier, retrieving, by the central system, the first perceptual quality measure from the at least one database;

comparing, by the central system, the first perceptual quality measure to the second perceptual quality measure included in the at least one packet; and based at least in part on a result of having compared the first perceptual quality measure to the second perceptual quality measure included in the at least one packet, determining, by the central system, a level of the perceptual quality degradation of the multimedia content at the computerized end-user mobile device;

providing, by the central system to the multimedia content provider, a report of successful or unsuccessful delivery of the multimedia content to the end-user mobile device based at least on the level of the perceptual quality degradation of the multimedia content at the computerized end-user mobile device; and in response to the providing of the report to the multimedia content provider, causing a mapping of perceptual quality to provider-specific content to be established, the provider-specific content including the multimedia content transmitted over the at least one network and received at the computerized end-user mobile device.

11. The method of claim 10 wherein the first content identifier and the second content identifier correspond to a first multimedia fingerprint and a second multimedia fingerprint, respectively, for the multimedia content, and wherein the generating of the second content identifier for the multimedia content includes generating the second multimedia fingerprint for the multimedia content.

12. The method of claim 10 wherein the first content identifier and the second content identifier correspond to first identifying metadata and second identifying metadata, respectively, for the multimedia content, and wherein the providing of the second content identifier to the central system includes providing the second identifying metadata to the central system.

13. The method of claim 10 wherein the first content identifier and the second content identifier correspond to a first multimedia watermark and a second multimedia watermark, respectively, for the multimedia content, wherein the method further comprises detecting the second multimedia watermark in the multimedia content by the computerized end-user mobile device, and wherein the providing of the second content identifier to the central system includes providing an indication of the second multimedia watermark to the central system.

14. The method of claim 10 wherein the generating, by the computerized end-user mobile device, of the second perceptual quality measure for the multimedia content includes generating a perceptual quality measurement of image blur in the multimedia content.

15. The method of claim 10 wherein the generating, by the computerized end-user mobile device, of the second perceptual quality measure for the multimedia content includes generating a perceptual quality measurement of blocking artifacts in the multimedia content.

16. The method of claim 10 wherein the generating, by the computerized end-user mobile device, of the second perceptual quality measure for the multimedia content includes generating the second perceptual quality measure using a no-reference perceptual quality measurement technique.

17. The method of claim 10 further comprising:

encapsulating the second content identifier and the second perceptual quality measure, wherein the providing of the second content identifier and the second perceptual quality measure to the central system includes transmitting the encapsulated second content identifier and second perceptual quality measure to the central system.

18. A method of determining a level of perceptual quality degradation of multimedia content as received at at least one end-user mobile device over at least one network, the method comprising:

generating a first content identifier for the multimedia content by a computerized multimedia content provider;

generating a first perceptual quality measure of at least blurriness or blockiness in the multimedia content by the computerized multimedia content provider, the first perceptual quality measure being representative of perceptual quality of the multimedia content prior to its transmission over the at least one network;

providing, by the computerized multimedia content provider, the first content identifier and the first perceptual quality measure to a central system;

providing, by the computerized multimedia content provider, the multimedia content for insertion into a multimedia content stream;

transmitting, by the computerized multimedia content provider, the multimedia content stream containing the multimedia content to an end-user mobile device over the at least one network, a second content identifier for the multimedia content and a second perceptual quality measure of at least blurriness or blockiness in the multimedia content being generated by the end-user mobile device; the second content identifier, the second perceptual quality measure, and a session ID being provided, by the end-user mobile device, in at least one packet to the central system over at least one transmission path between the central system and the end-user mobile device, the session ID being provided by the central system to the end-user mobile device over the at least one transmission path in response to a request for a session with the central system from the end-user mobile device, the second perceptual quality measure being representative of the perceptual quality of the multimedia content subsequent to being transmitted over the at least one network and received at the end-user mobile device;
obtaining, by the computerized multimedia content provider from the central system, a report of successful or unsuccessful delivery of the multimedia content to the end-user mobile device based at least on a level of the perceptual quality degradation of the multimedia content at the end-user mobile device, the report being based at least in part on:
a separation of the at least one packet from a plurality of other packets received at the central system from one or more other end-user mobile devices based on the session ID included in the at least one packet; and
having separated the at least one packet from the plurality of other packets:
a verification of the second content identifier included in the at least one packet against the first content identifier for the multimedia content by the central system; and
responsive to the verification of the second content identifier against the first content identifier, a result of a comparison of the first perceptual quality measure to the second perceptual quality measure included in the at least one packet by the central system; and
in response to the obtaining of the report by the computerized multimedia content provider, causing a mapping of perceptual quality to provider-specific content to be established, the provider-specific content including the multimedia content transmitted over the at least one network and received at the end-user mobile device.

19. The method of claim 18 wherein the first content identifier and the second content identifier correspond to a first multimedia fingerprint and a second multimedia fingerprint, respectively, for the multimedia content, and wherein the generating of the first content identifier for the multimedia content includes generating the first multimedia fingerprint for the multimedia content.

20. The method of claim 18 wherein the first content identifier and the second content identifier correspond to first identifying metadata and second identifying metadata, respectively, for the multimedia content, and wherein the providing of the first content identifier to the central system includes providing the first identifying metadata to the central system.

21. The method of claim 18 wherein the first content identifier and the second content identifier correspond to a first multimedia watermark and a second multimedia watermark, respectively, for the multimedia content, and wherein the providing of the first content identifier to the central system includes providing an indication of the first multimedia watermark to the central system.

22. The method of claim 18 wherein the generating of the first perceptual quality measure for the multimedia content includes generating a perceptual quality measurement of image blur in the multimedia content.

23. The method of claim 18 wherein the generating of the first perceptual quality measure for the multimedia content includes generating a perceptual quality measurement of blocking artifacts in the multimedia content.

24. The method of claim 18 wherein the generating of the first perceptual quality measure for the multimedia content includes generating the first perceptual quality measure using a no-reference perceptual quality measurement technique.

25. The method of claim 18 wherein the multimedia content provider corresponds to an advertiser, wherein the multimedia content corresponds to advertisement content, and wherein the providing of the multimedia content for insertion into the multimedia content stream includes providing the advertisement content for insertion into the multimedia content stream.

26. A system for determining a level of perceptual quality degradation of multimedia content as received at at least one end-user mobile device over at least one network, comprising:
at least one processor; and
at least one memory communicably coupled to the at least one processor, wherein the at least one processor is operative to execute at least one program out of the at least one memory:
to receive, from a multimedia content provider, a first content identifier for the multimedia content, and a first perceptual quality measure of at least blurriness or blockiness in the multimedia content, the first perceptual quality measure being representative of perceptual quality of the multimedia content prior to its transmission over the at least one network;
to store the first content identifier and the first perceptual quality measure in a content identifier database and a perceptual quality measure database, respectively;
to receive a request for a session with the system from an end-user mobile device;
in response to the request for the session, to transmit a session ID for the session to the end-user mobile device over at least one transmission path to establish the session with the end-user mobile device;
during the session with the end-user mobile device:
to receive, from the end-user mobile device over the at least one transmission path, at least one packet including (1) a second content identifier for the multimedia content, (2) a second perceptual quality measure of at least blurriness or blockiness in the multimedia content, and (3) the session ID, the second perceptual quality measure being generated by the end-user mobile device and being representative of the perceptual quality of the multimedia content subsequent to being transmitted over the at least one network and received at the end-user mobile device;
based on the session ID included in the at least one packet, to separate the at least one packet from a plurality of other packets received at the computerized central system from one or more other end-user mobile devices;
having separated the at least one packet from the plurality of other packets:
to verify the second content identifier included in the at least one packet against the first content identifier stored in the content identifier database;
having verified the second content identifier included in the at least one packet against the first content identifier, to retrieve the first perceptual quality measure for the multimedia content from the perceptual quality measure database;
to compare the first perceptual quality measure to the second perceptual quality measure included in the at least one packet;
based at least in part on a result of having compared the first perceptual quality measure to the second perceptual quality measure included in the at least one packet, to obtain a report of successful or unsuccessful delivery of the multimedia content to the end-user mobile device based at least on a level of the perceptual quality degradation of the multimedia content at the end-user mobile device; and in response to obtaining the report, to cause a mapping of perceptual quality to provider-specific content to be established, the provider-specific content including the multimedia content transmitted over the at least one network and received at the end-user mobile device.

27. The system of claim 26 wherein the at least one processor is further operative to execute the at least one program out of the at least one memory to obtain, responsive to the verifying of the second content identifier against the first content identifier, a content identifier index for the multimedia content, and to retrieve the first perceptual quality measure from the perceptual quality measure database using the content identifier index.

* * * * *